(12) United States Patent
Josiassen et al.

(10) Patent No.: US 9,811,110 B2
(45) Date of Patent: Nov. 7, 2017

(54) SYSTEM AND A METHOD OF DERIVING INFORMATION

(71) Applicant: Napatech A/S, Søborg (DK)

(72) Inventors: René Krog Josiassen, Værløse (DK); Søren Kragh, Valby (DK)

(73) Assignee: Napatech A/S, Søborg (DK)

( * ) Notice: Subject to any disclaimer, the term of this patent is extended or adjusted under 35 U.S.C. 154(b) by 8 days.

(21) Appl. No.: 14/924,876

(22) Filed: Oct. 28, 2015

(65) Prior Publication Data

US 2016/0116935 A1    Apr. 28, 2016

(30) Foreign Application Priority Data

Oct. 28, 2014    (EP) .................................... 14190666

(51) Int. Cl.
  *G06F 1/04*    (2006.01)
  *G06F 3/05*    (2006.01)
  *H04J 3/06*    (2006.01)

(52) U.S. Cl.
  CPC .................. *G06F 1/04* (2013.01); *G06F 3/05* (2013.01); *H04J 3/0697* (2013.01)

(58) Field of Classification Search
  CPC ............. G06F 1/04; G06F 3/05; H04J 3/0697
  See application file for complete search history.

(56) References Cited

U.S. PATENT DOCUMENTS

| | | | |
|---|---|---|---|
| 4,430,720 A * | 2/1984 | Aemmer | B65H 63/062 700/144 |
| 5,632,272 A * | 5/1997 | Diab | G06K 9/0051 600/323 |
| 5,638,008 A | 6/1997 | Rangasayee et al. | |
| 5,805,871 A | 9/1998 | Baxter | |
| 6,029,253 A | 2/2000 | Houg | |
| 7,035,269 B2 | 4/2006 | Rolston et al. | |

(Continued)

FOREIGN PATENT DOCUMENTS

| | | |
|---|---|---|
| WO | WO8504498 | 3/1985 |
| WO | WO2009121421 | 10/2009 |

OTHER PUBLICATIONS

Baumann, T. et al, "The GANDALF 128-channel time-to-digital converter", Journal of Instrumentation, Institute of Physics Publishing, Bristol, GB, 8:1:C01016, XP020237117, ISSN: 1748-0221, DOI: 10.1088/1748-0221/8/01/C01016, (Jan. 10, 2013).

(Continued)

*Primary Examiner* — Thomas Lee
*Assistant Examiner* — Chad Erdman
(74) *Attorney, Agent, or Firm* — McHale & Slavin, P.A.

(57) ABSTRACT

A system and a method of sampling an event signal using multiple clocking signals each provided in a separate candidate clock domain each of which also receives points in time from a master clock. From each candidate clock domain, clocked by the individual clocking signals, pairs of a received point in time and event signal value are fed to a master clock domain. In the master clock domain, the values of the event signal may be determined over time as a function of master clock time. This may be used for synchronizing operation in the master clock domain of e.g. packet time stamping with an overall time defined by the event signal. Using multiple clocking signals for the sampling, a much more precise sampling of the event signal is facilitated.

27 Claims, 1 Drawing Sheet

(56) References Cited

U.S. PATENT DOCUMENTS

| | | | |
|---|---|---|---|
| 7,325,152 B2 | 1/2008 | Wallner et al. | |
| 7,480,357 B2 | 1/2009 | Adkisson et al. | |
| 7,599,462 B2 | 10/2009 | Melanson | |
| 7,724,855 B2 | 5/2010 | Lawson | |
| 8,301,932 B2 | 10/2012 | Hay et al. | |
| 9,355,691 B2* | 5/2016 | Singh | G11C 7/1057 |
| 2005/0071703 A1 | 3/2005 | Lee et al. | |
| 2005/0216247 A1* | 9/2005 | Ikeda | G06F 17/5018 |
| | | | 703/19 |
| 2006/0129350 A1 | 6/2006 | West | |
| 2006/0164902 A1 | 7/2006 | Fung | |
| 2013/0254583 A1 | 9/2013 | Rifani et al. | |
| 2013/0343409 A1* | 12/2013 | Haulin | H04J 3/0697 |
| | | | 370/503 |
| 2014/0211816 A1* | 7/2014 | Ekner | H04J 3/0697 |
| | | | 370/503 |
| 2014/0247175 A1* | 9/2014 | Dasgupta | H03M 1/0845 |
| | | | 341/155 |
| 2016/0142167 A1* | 5/2016 | Smitt | H04L 7/005 |
| | | | 370/503 |

OTHER PUBLICATIONS

Lynch, J., "Teaching digital timing: a comprehensive approach", IEEE Transactions on Education, 51:3:325-330, (Aug. 2008).

* cited by examiner

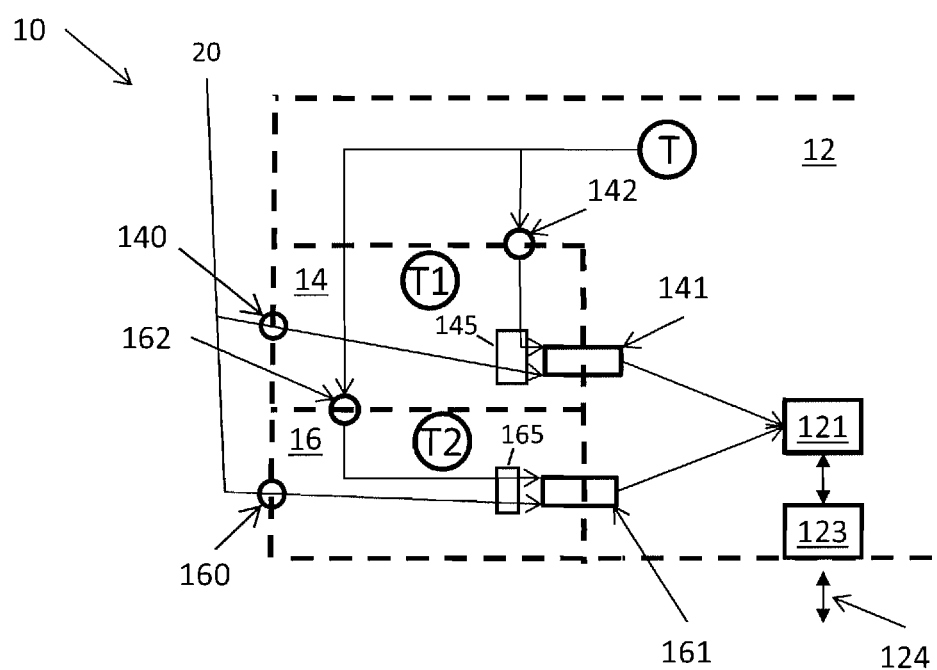

SYSTEM AND A METHOD OF DERIVING INFORMATION

PRIORITY CLAIM

In accordance with 37 C.F.R. 1.76, a claim of priority is included in an Application Data Sheet filed concurrently herewith. Accordingly, the present invention claims priority to European Patent Application No. 14190666.9, entitled "A SYSTEM AND A METHOD OF DERIVING INFORMATION", filed Oct. 28, 2014. The contents of the above referenced application is incorporated herein by reference.

FIELD OF THE INVENTION

The present invention relates to a system and a method where a value of an event signal is fed to each of a plurality of candidate clock domains where this value is analysed or fed to a register together with a received point in time of a master clock.

BACKGROUND

Technology related to digital system timing may be seen in: US2006/129350, WO2009/121421, US2006/164902, U.S. Pat. No. 7,724,855, U.S. Pat. No. 8,301,932, U.S. Pat. No. 6,029,253, US2005/0071703, WO85/004498, US2013/0254583, U.S. Pat. No. 5,805,871, U.S. Pat. No. 7,035,269, U.S. Pat. No. 7,325,152, U.S. Pat. No. 7,480,357, U.S. Pat. No. 7,599,462, U.S. Pat. No. 5,638,008, "the GANDALF 128-bit Time-to-Digital Converter", journal of instrumentation, institute of physics publishing, Bristol, vol. 8, no. 1, p. C01016 (10 Jan. 2013) and "Teaching Digital System Timing: A Comprehensive Approach"; John D. Lynch; 2008.

SUMMARY

Embodiments of the invention are directed to a system and a method of sampling an event signal using multiple clocking signals each provided in a separate candidate clock domain each of which also receives points in time from a master clock. The points in time where the value fulfils a criterion may be fed to a master clock domain, or pairs of a point in time and a value of the event signal are fed to the master clock domain where information may be derived therefrom. The overall functionality is the sampling of the event signal using a plurality of clocking signals—each provided in a separate candidate clock domain, and the data is fed to the master clock domain where analysis is performed.

Other aspects are described infra.

BRIEF DESCRIPTION OF THE DRAWING

FIG. 1 is a schematic illustration of a preferred embodiment showing a system 10 having a master clock domain 12 and two candidate clock domains 14 and 16.

DETAILED DESCRIPTION

In a first aspect, the invention relates to a system comprising:

a master clock domain having a master clock and a master processor, the master clock being configured to output master points in time and a plurality of candidate clock domains each having:

a candidate clock configured to output a candidate clock signal, an event signal input, a first and a second asynchronous register and a candidate controller configured to receive a first point in time from the first asynchronous register and a first value from the event signal input and feed, timed by the candidate clock signal, at least a second point in time relating to the first point in time to the second asynchronous register, where:

the master clock is configured to provide an actual master point in time to the first asynchronous registers and the master processor is configured to read the second points in time of the second asynchronous registers and derive first information therefrom.

In this respect, a system may be comprised on a single chip or wafer or multiple chips or wafers. A chip/wafer may be an ASIC, an FPGA, a processor, DSP or the like or a part thereof. Naturally, multiple such elements may be used, where data and/or clocking signals may be exchanged there between.

A clock domain preferably comprises one or more circuits which receive a clocking signal from the same clock.

Clocking signals are usually output from or generated by an oscillating element, such as a crystal. A clocking signal is typically periodic and often varies between two values, such as a square-wave signal.

A clock outputs a clocking signal which may be a periodic signal and/or a varying value, such as a point in time which varies over time. The point in time may be updated and/or output periodically and usually is increased for each update. A point in time may be a date:hour:minute:second type of value or it may simply be a value, such as an integer, which is increased periodically. The value may, when reaching a maximum value, be wrapped around to again start from a minimum value.

A clocking signal may simply be a varying, periodic signal, such as a sinusoidal signal or a square-shaped signal altering between two values.

Often, a clock domain is present on a single chip or wafer, especially when the clock frequency of the clocking signal is high. Multiple clock domains may be present on a single chip/wafer.

The master clock domain and the individual candidate clock domains are separate clock domains in the sense that they are clocked by different clocking signals. Situations exist where the same clock outputs different clocking signals which may be fed to different clock domains.

In general, different clocking signals may have the same frequency but different phases or may have different frequencies. Usually, a clock domain comprises a number of elements, such as circuits, clocked by the clocking signal of the clocking domain. Signals may be exchanged between clocking domains using e.g. asynchronous registers, FIFOs, delay lines or the like.

Preferably, the master clock outputs its (master) points in time periodically, but this is not required.

The master processor, as any processor or controller for use in the system of the invention, may be formed by a single wafer, such as a single ASIC, FPGA, DSP or the like, or it may be distributed as multiple wafers. The processor/controller may form part of a larger wafer also incorporating other of the systems elements, such as a clock, another processor/controller, a register/FIFO or the like.

A plurality of candidate clock domains are provided. The number of candidate clock domains will depend on a number of factors, such as space, power consumption as well as availability of candidate clock signals and the requirements as to the first information.

Each candidate clock domain has a candidate clock, which outputs a candidate clocking signal. A candidate clock may be a separate clocking signal generating element, such as a crystal, or it may be an input for receiving a clock signal from a clocking signal source.

The event signal may be any type of signal. Preferably, the event signal varies. A variation of the event signal may be a periodic variation or a more stochastic variation. The same event signal is fed to all event signal inputs, preferably simultaneously and/or within a time period smaller than a timing precision with which the first information is desired.

In general, what is desired is a correspondence between the received event signal and the points in time of the master clock. Thus, an analysis of the value of the event signal may be desired to e.g. identify maxima, minima, particular values, edges, slopes or the like. This analysis may be performed by the candidate controllers or the master processor.

In some embodiments, the, first, point in time read from the first register may be fed directly to the second register so that the first and second points in time are the same. In other embodiments, an offset may be added to the first point in time to generate the second point in time. This offset may relate to a delay between the master clock obtaining a value and until that value being available (or e.g. exceeded) from the first register. The second point in time may also be calculated from a plurality of points in time of the first register e.g. when (see below) this comprises or stores multiple points in time.

In one embodiment, the analysis of the event signal is performed in the candidate controllers which may identify e.g. a particular edge or transition of the received first value and feed only the second point in time directly to the second register, so that the master processor receives, from that second register, points in time relating to when the corresponding candidate controller identifies the edge/transition or other parameter (see below) of the event signal.

Thus in one embodiment, the candidate controllers are configured to feed only the second point in time to the second asynchronous register.

In other embodiments, pairs of the second point in time and a second value (see below) are fed to the master processor for analysis.

A conversion of the event signal from the first value to a second value may be performed as described below. Naturally, the first and second values may be the same, when no conversion is performed.

In a preferred embodiment, the event signal varies between values which may be fed directly into the second register. In this situation, the first and second values may be the same.

Alternatively, the candidate controller may be configured to convert the received first event signal value into the second value. This conversion may be adapted to convert the signal to more easily identify parameters, such as maxima, minima, slopes, edges, values or the like. Another type of conversion may be for adapting the second value to be fed to the second register. The conversion may be an A/D conversion or a value conversion from one value to another value adapted to be fed to the second register (see below). A value conversion may be a conversion from one value range, such as values with many ciphers and/or a wide range, to values with a lower number of ciphers and/or a more narrow range. As described above, situations exist in which only the second points in time are fed to the second registers, such as when one or more candidate controllers are configured to analyse the received first value and feed the second point in time to the second register, when the received first value fulfils a predetermined criterion or fulfils a predetermined parameter. This criterion may be any type of criterion such as that the first value exceeds, assumes or falls below a predetermined value, that it reaches a maximum or minimum, that it has a slope exceeding, assuming or falling below a predetermined threshold slope, that an edge is detected or the like.

Preferably, however, the candidate controllers are configured to feed a pair of the second point in time and a second value, relating to the first value, to the second register, the master controller being configured to derive the first information also on the basis of the received second values of the pairs. The second value may be the same as the first value or may be derived from a conversion of the first value. A number of reasons and manners are described in the following.

The second register may, for each pair, have a storage location with a predetermined number of bits, where the second event signal value may be allowed to take up a first number of bits, so that the conversion may be a conversion from the first event signal value as received (analogue, digital, wide range of values and/or values with many ciphers) to one of a plurality of predetermined second values and/or within a predetermined value range.

A conversion type may alternatively or additionally be a thresholding where first event signal values within a predetermined value range are converted into a predetermined second value. A thresholding may be the converting of all first event signal values above a threshold value into one second value and all other first event signal values into another, second value (different from the one value). Another type of thresholding may be to divide the value interval or space of the first event signal values into a plurality of smaller, non-overlapping value intervals/spaces and convert all first values within a single interval/space into the same second value, where the second values assigned to the different intervals/spaces are different.

A conversion may be a noise reduction, filtering, amplification, smoothing or any other type of signal adaptation or conversion.

Preferably, all candidate controllers perform, if at all, the same conversion of the first event signal values, so that the second values read from the pairs by the master processor may be directly compared. Alternatively, the master processor may be informed of what conversions which candidate controllers perform.

Preferably, the second event signal value is fed to all candidate clock domains in the same manner, such as simultaneously. Then, the second event signal value may be converted "centrally" as opposed to it being converted individually in each candidate clock domain. The second event signal value may be fed to the candidate clock domains directly and not, as the points of time from the master clock, over a clock boundary.

The event signal may be in principle be any type of signal, such as a periodic signal or a non-periodic signal. In order to be able to rely on the event signal, a periodic signal is preferred. It is desired that the frequency of the event signal is rather high in order to get frequent changes therein. It is desired that a precise PPS (pulse per second) source is used. Presently preferred event signals may be derived from GPS signals, clock sources used for or derived from PTP or the like. However, the event signal may be derived from airborne timing signals, such as derived from the GSM network, international, airborne clocking signals, other signals from e.g. satellites or the like.

The first and second registers may be implemented as FIFOs, delay lines or the like. This is described further below. The operation of the registers is to transport the data (points in time and values) over clock boundaries, where the data may be fed to the registers controlled by one clocking signal and read therefrom controlled by another clocking signal.

The candidate controller may simply read a point in time from the first register and feed this point in time to the second register together with an event signal value, converted if desired.

Preferably, the candidate controllers perform this feeding controlled by different candidate clocks and thus at different points in time. Preferably, the candidate controller feeds an updated, recent or actual second event signal value, converted if desired, to the second register. Alternatively, if a delay is detected or caused, information in this respect may be fed to the master processor—via the second register or via a separate data path.

As will be described further below, a delay may be seen between the master clock assuming a value and that value being read or readable in a candidate clock domain. This delay may be determined quite precisely and can be taken into account in the determination of the first information.

Preferably, the master clock provides the actual master point in time to all first registers synchronously or at least substantially at the same time. If the register is not able to receive the master point in time, no updating of the register may take place. That register will then, when again able to receive a point in time, receive a next update from the master clock.

The master processor is configured to read the points in time or pairs of values and derive first information therefrom. This first information may be used for a number of purposes.

In one situation, the sampling of the event signal by the individual candidate clocks may be used as a sampling of the event signal with a frequency higher than that offered by any of the candidate clocks alone.

Then, the master clock may receive a number of pairs of a second point in time and the corresponding second value of the event signal. From these pairs, the evolvement of the first/second event signal values over time may be determined or analysed. This analysis may be used for determining parameters of the first/second event signal or values, such as minima, maxima, slopes, exceeding, assuming or falling below threshold values, frequencies, values, or the like. Any signal analysis may be performed.

Also, the relation between the master clock time of sampling (such as the time of conversion and/or feeding to the second register as the second point in time) and the second event signal value may be determined. The point in time of the master clock at which the first/second event signal value reached a predetermined value, for example, may be used for controlling timing of other processes—or setting the master clock point in time. In this situation, the event signal may be used as a time synchronization signal.

This synchronizing may be used for controlling a point in time of a clock used for other purposes, such as time stamping of received data packets, timed transmission of data packets or the like. Multiple systems of the present type may receive the same event signal, such as if output by a GPS satellite, and thus be synchronized to each other.

In one embodiment, the master processor is configured to derive, as the first information, an estimate of a point in time of the master clock, where the event signal:
assumed a predetermined value,
exceeded a predetermined value,
fell below a predetermined value,
altered between two values, and/or
exceeded a threshold slope.

As mentioned above, the same analysis may be performed in one or more candidate controllers.

In this respect, the master processor may identify that of the values or the pairs read from the second registers in which the second event signal value has a value fulfilling the requirement (exceeding, falling below, identical to, altered or the like) and which value e.g. has an earliest second point in time. Thus, the earliest second point in time after this requirement has been fulfilled will be determined.

Alternatively, a value or pair may be identified such as having a latest second point in time, where the second value does not fulfil the requirement.

Naturally, an averaging of the earliest and latest second points in time may give a more precise point in time of the actual fulfilling of the requirement.

Thus, the master processor may be configured to derive the first information from a pair having an earliest second point in time or a latest second point in time as well as a predetermined second value, a second value different from a predetermined value, a second value exceeding a predetermined value or a second value falling below a predetermined value.

The threshold or predetermined value may be selected for a number of purposes. A threshold value or slope may be selected, if it is seen at a suitable frequency, for example, for it to be used for synchronizing the timing of other processes. This is described further below.

Naturally, the first point in time read from the first register may be fed into the second register as the second point in time. Alternatively, this first point in time may be altered, such as added or subtracted a value describing a delay between the master clock assuming a value and that value being readable from the first register—to form the second point in time. Especially when the first register is implemented as a FIFO or a delay line, a delay will be present, which may be estimated. This estimation is explained further below.

Further alternatively, this delay, which may vary from candidate clock domain to candidate clock domain and thus from second register to second register, may be determined or estimated and used by the master processor in the determination of first information, where the second points in time of the pairs are then adjusted either prior to feeding to the second registers or subsequent to reading there from.

In one embodiment, the system further comprises a timing device configured to receive points in time from the master clock and the first information and to output corrected points in time. This timing device may be used as a clock, for example, and it may be used for timing other processes, such as time stamping.

Alternatively, the timing device may be configured to only receive a clocking signal from the master clock and separate signals or indications as to when a point in time of the timing device are to be predetermined values. Thus, the timing device may be controlled by e.g. a frequency received from the master clock, but the points in time of the timing device may be determined from the first information, such as a point in time, determined by the master processor and optionally also real or updated point in time from the master clock.

In one embodiment, the system further comprises, for, such as in, at least one candidate clock domain, a processor, which may be formed by the controller of the candidate clock domain, which is configured to determine a delay between the master clock obtaining a predetermined value and the predetermined value being fed to the second asynchronous register as the second point in time. This is described above and will be described further below.

The above timing device may be configured to output the corrected points in time also on the basis of the determined delay(s). This may be obtained by corrected points in time being fed to the second registers and/or the master processor correcting the points in time read, for example.

In one embodiment, the system further comprises a data receiving device configured to receive data from a data channel and points in time from the timing device and output received data and a time of receipt of the data.

In one embodiment, the system further comprises a data transmitting device configured to receive data, a point in time of transmission and corrected points in time from the timing device and to output the received data when the corrected point in time reaches the point in time of transmission. This may be the situation where it is required that the data is output at a desired point in time. This corrected point in time may be in accordance with e.g. a global timing signal, as would be the case if the event signal was derived from a GPS satellite.

A second aspect of the invention relates to a method of deriving first information, the method comprising the steps of:
a master clock providing, in a master clock domain, points in time to first asynchronous registers,
in each of a plurality of candidate clock domains:
receiving the first point in time from a first asynchronous register and a first value from an event signal input and feeding, timed by a candidate clock signal of the candidate clock domain, at least a second point in time, relating to the first point in time, to a second asynchronous register,
in the master clock domain, reading the second points in time of the second asynchronous registers and deriving the first information therefrom.

As mentioned above, the second point in time may relate to a point in time where the first value fulfils a requirement. Thus, the receiving/feeding step preferably comprises feeding the second point in time to the second register, when the second or first value fulfils a predetermined criterion.

As mentioned above, the first information may be used for a number of purposes, such as a high frequency or high precision sampling of the event signal for e.g. synchronization purposes.

Preferably, an event signal is fed simultaneously or at least substantially simultaneously to the event signal inputs of the individual candidate clock domains. Alternatively, if a delay is seen between providing the event signal to one event signal input and the providing of the event signal to another event signal input, this delay may be taken into account, as the skilled person will know.

Preferably, the master clock provides the points in time periodically. Often, clocks are controlled by oscillators and will output either simply a periodic signal or, in more complex clocks, a value varying over time but output periodically.

Preferably, the points in time are fed to the first register either without delay or with a known delay. The first register may not always be ready to accept data. In situations where the first register is not ready to accept data, preferably no point in time is entered, and this point in time is preferably not stored but an updated point in time is fed to the first register, when it is again ready to receive a point in time.

Preferably, each candidate clock domain has a separate first register from which the first points in time are read controlled by the respective candidate clock signal.

In one embodiment, the receiving/feeding step comprises feeding to the second register a pair of the second point in time and a second value based on the first value. In another embodiment, only the second point in time is fed to the register.

Also, preferably the storing of the second points in time or the pairs in the second registers is performed in the individual clock domains and into separate second registers and again controlled by the respective candidate clock signal.

The controlling of feeding data to or reading data from a register using a clocking signal usually is the feeding/reading on a selected characteristic of the clocking signal, such as a rising or falling flange of the signal. Usually, the rising flange (change from value "0" to value "1" in a binary signal, for example) is used.

The first value may be the above event signal which may be received where after the second value may be derived. This second value may be directly derived from the signal, if it e.g. is a binary signal, so that the first and second values are the same. Alternatively, the second value may be derived from the first value via a conversion as is described above. The receiving step thus may comprise also a step of receiving a first event signal value and providing the second value, such as using a conversion of the first value into the second value.

Naturally, if the candidate clock signals have different frequencies and/or phases, which is usually the situation, the pairs or points in time are read into the second registers at different points in time.

Having fed the points in time or pairs to the second registers, the above deriving of the first information may be performed.

In one embodiment, as is also described above, the step of deriving the first information comprises deriving, as the first information, an estimate of a point in time of the master clock, where the first/second values of the event signal:
assumed a predetermined value,
exceeded a predetermined value,
fell below a predetermined value,
altered between two values, and/or
exceeded a threshold slope.

Also, a latest point in time may be determined where the first/second value had another value, was below or above the predetermined value, had not yet altered or had a lower slope, for example. As mentioned, an averaging of the latest and earliest point in time (the points in time on both sides of the actual event) may be used. The point in time of the master clock may be replaced by the second points in time if desired.

From the pairs, the change of the first or second value over time may be derived or seen, so many different types of analysis may be performed. If the first/second value amounts to sampled values of a periodic, such as a sinusoidal, signal, for example, the frequency may be determined, and any point on the sinusoidal/periodic curve may be determined quite precisely. More than one point in time on one or both sides of an event may, naturally, be used, and a priori knowledge about the value may also be used (such as that it is periodical or the like).

In addition or optionally, the step of deriving the first information comprises deriving the first information from a pair having an earliest second point in time or a latest second point in time as well as a predetermined second value, a second value different from a predetermined value, a second value exceeding a predetermined value or a second value falling below a predetermined value, for example.

Naturally, the same analysis may be used based merely on the second point in time.

Also, the method may comprise the step of, in at least one candidate clock domain, converting the first value into the second value.

In one embodiment, the method further comprises the step of generating corrected points in time on the basis of points in time from the master clock and the first information. As mentioned above, this may be due to delays especially between the master clock assuming a value and until this value is available from the first registers as the first point in time and/or is fed into the second register as the second point in time. The method thus may further comprise the step of, for at least one candidate clock domain, determining a delay between the master clock obtaining a predetermined value and the predetermined value being fed to the second asynchronous register as the second point in time.

Then, the generation of the corrected points in time is preferably based also on the determined delay(s).

The timing device may e.g. be used for time stamping, by further having the step of receiving data from a data connection and corrected points in time from the timing device and a time of receipt of the received data. Received data may also be output. The output data may comprise there in the point in time of receipt.

In addition or alternatively, the timing device may be used for controlling the timed outputting of data, where the method further comprises the steps of receiving:
 data,
 a point in time of transmission and
 corrected points in time
and outputting the received data when the corrected points in time reach the point in time of transmission.

In the following, preferred embodiments will be described with reference to the drawing, wherein:

FIG. 1 illustrates a preferred embodiment according to the invention.

In FIG. 1, a system 10 is illustrated having a master clock domain 12 and two candidate clock domains 14 and 16. In the master clock domain, a master clock T is seen, which alters its point in time with a master clock frequency and feeds its point in time to first FIFOs 142/162 to feed the points in time into the candidate clock domains 14/16.

Each clock domain 14/16 has its own clock T1/T2, respectively, which outputs a clock signal with a known clock frequency and which is used for timing or clocking processes in the respective domain. The clocks T/T1/T2 need not themselves be the origins of the clock signals but may be inputs receiving clocking signals from somewhere else.

Often the clocks T/T1/T2 have the same frequencies but different phases, but they may also have different frequencies.

An event signal 20 is provided. This signal may be any type of signal and need not be periodic. Usually, the event signal is periodic and of a lower frequency than T/T1/T2.

The event signal has different values but may change between only two values if desired.

Using the multiple of candidate clock domains thus means that the event signal value is detected or sampled using multiple clocking signals. This then may provide a better and more precise (higher resolution) sampling of the event signal change/value.

The event signal is fed via inputs 140, 160 to second FIFOs 141/161 of the first and second clock domains, respectively. In another embodiment, the FIFOs 141/161 may be implemented as asynchronous registers 141/161. The advantage of FIFOs is described further below. The event signal is fed directly to the FIFOs 141/161 or at least to the first/second clock domains 12/14 without intervening steps, so that the signal is received in the clock domains at least substantially simultaneously.

Alternatively, the event signal may be converted and a converted value fed to the FIFOs 141/161.

Into the FIFOs 141/161 are also fed the points in time of the registers 142/162. Alternatively, altered points in time may be fed to the registers 142/162, such as points in time corrected for a delay between the master clock T assuming a value and until that value is available from the FIFOs 141/161, or values calculated from the contents of the FIFOs 141/161 as described below.

This loading of the FIFOs 141/161 is controlled by a respective controller 145, 165, of the clock domains 14/16 and timed by the candidate clocking signals. For all practical purposes, the controllers may be seen as a part of the clocks T1 and T2.

Thus, controlled by the clocking signals of clocks T1 and T2, the points in time of the registers 142/162 and the value of the event signal 20 are fed into the FIFOs 141/161, usually combined into the same address or data area of the FIFO.

This data is now clocked through the FIFOs 141/161 and is finally read by a processor 121 in the master clock domain 12.

It is understood that the sampling (storing of the values in the FIFOS 141/161) of the event signal is performed at the frequencies of the clocking signals of the clocks T1 and T2. When these are not of identical frequencies and phases, this sampling is performed more often and thus with a higher resolution than if sampled with the frequency of the clocking signal from only one of the clocks T1 and T2.

The values of the event signal at the different points in time of sampling—derived from the FIFOs 142/162—are thus fed to the master clock domain 12.

The processor 121 may use this information in a number of manners.

In one manner, the event signal is sampled over time and pairs of points in time (delayed, though) and the value of the event signal are fed to the processor 121, which may then regenerate the event signal values over time. This may be a general sampling of a signal with a higher resolution than that possible using only a single clock. Different parameters of the event signal may then be determined, such as points in time of maxima, minima, exceeding/falling below thresholds, obtaining predetermined values, values of increases/decreases (slopes) or the like.

In a particular embodiment, it is desired to determine the actual point in time, of the clock T, where the change or value of the event signal is seen/received in the candidate clock domains 14/16. This point in time may be used for e.g. synchronizing other operations, such as time stamping, performed in the clock domain 12. The event signal may be a global or regional signal to which a local clock is desired synchronized.

This synchronized local clock may then be used for other purposes, such as time stamping of received data packets, timed transmission thereof or the like. Naturally, a number of systems may receive the same event signal and thus be synchronized to each other.

Thus, the point in time of the clock T where the change/value of the event signal is seen may be used for determining a relation between a predetermined point in time defined by the change/value of the event signal (e.g. if the event signal changes its value every second) and the point in time of the clock T, so that the point in time of the clock T is corrected or an offset determined in relation to the point in time of the clock T. Naturally, the same event signal may be used for synchronizing a number of circuits to each other, where each circuit is positioned in a master clock domain connected to a plurality of candidate clock domains. Naturally, one candidate clock domain may receive points in time from multiple master clocks and feed these points in time and the event signal value into registers/FIFOs to multiple master clock domains.

Preferably, the processor 121 is configured to, from the data read from the FIFOs 141/161, determine the FIFO address (pair of a point in time and a value) with the earliest point in time and where a predetermined change/value of the event signal is seen. Knowing the delay (over the registers 142/162) between the master clock T obtaining a given value and that value being fed to the FIFO 142/162, the processor 121 may determine at which actual point in time of the clock T, the change in the event signal actually took place.

Naturally, the processor 121 may alternatively identify the latest point in time with a predetermined value of the event signal—i.e. the latest sample before the change.

A better estimate may be obtained by e.g. averaging the latest point in time before the change is seen and the first point in time after the change is seen. Also, more elaborate estimates may be obtained using curve fitting if desired using multiple pairs of a point in time and a value.

Preferably, the change of the event signal is slow compared to the frequency of the clocks T/T1/T2, so that during two or more clock cycles of each clock T/T1/T2, the event signal has the same value. In this manner, the processor 121 need only look for a change in the value. Alternatively, the processor 121 may be configured to only look for a particular value of the event signal or a value exceeding or falling below a threshold value, for example.

In another embodiment, the controllers in the candidate clock domains 14 and 16 may be configured to only update the FIFOs 141/161 when the event signal fulfils a predetermined requirement, such as a change exceeding a predetermined threshold.

In general, if the first FIFO becomes empty, i.e. if the last value has been read, this value may be maintained in the second FIFO and re-read at the next update(s), until a new entry is made from the master clock domain side.

Having thus determined or estimated a point in time of the master clock T at which the e.g. change in question took place, the processor 121 may determine an offset to the actual points in time of the master clock T so that, taking into account this offset, a clock may be arrived at (output by the processor 121, altering the points in time of the clock T or the generation or controlling of another clock, if desired) which may be synchronized to or by the event signal and have the same frequency/phase as the master clock T.

This corrected clock may then be used for controlling or timing operations in the master clock domain 12, such as the time stamping of received data and/or the outputting of data in accordance with predetermined output points in time.

An input/output element 123 may be provided which receives the corrected points in time from the processor 121 or a corrected time outputting clock, and which determines a point in time, corrected point in time, of receipt of a data element, such as a data packet, received from a data connection 124. The data element may thus be time stamped. The data element and pertaining point in time of receipt may be fed to the processor 121 or other elements as is known in the art.

Alternatively or in addition, data packets may be received in the element 123 for outputting from the master clock domain 12. Together with, such as as a part of, the data elements, points of time of outputting the data elements are received, and the data elements are output to the data connection 124 at the correct points in time, in respect of the corrected points in time received by the input/output element 123.

Naturally, a number of other operations may be performed in the master time domain 12 controlled by or timed by the controlled points in time generated on the basis of the operation of the processor 121.

An advantage of using the FIFOs/delay lines is that it may be a challenge to ensure that a register is fully updated and stable, before it is read. This may be handled in a number of manners, such as the providing of a toggle signal for the register, where the system updating the register will, using the toggle signal, indicate that the register cannot be read, where the toggle signal is then altered, when the register again is stable. Circuits like FIFOs have a built-in stability against this type of situation.

In one embodiment, the registers 142/162 are embodied as FIFOs or delay lines.

The contents of the FIFO is a plurality, such as 2, 3, 4, 5, 6, 7, 8, 9, 10, 15, 20, 30 or more, 40 or more, 50 or more, 75 or more, 100 or more, 500 or more, points in time received from the master clock T.

A FIFO may in principle have any number of positions taken up, whereby a delay (when clocked constantly) through a FIFO may vary.

Thus, when a FIFO of this type is used, it may either be desired that the FIFO always is full (implemented as a delay line), or it may be desired to take into account, in the determination of the point in time, the number of data positions taken up in the FIFO. This is especially interesting when compensating for a delay between an actual point in time of the master clock and the actual value of the point in time calculated from the contents of the FIFO.

A FIFO or delay line may be implemented in any of a variety of manners, such as a linked list, but also a number of storage locations or addresses in a RAM or a Flash memory, for example, combined with information identifying the order of the data in the individual addresses, so that the overall functionality is obtained even though the data is stored more randomly in a storage.

Implementing the transfer of the points in time of the master clock T as a delay line may make the transfer of the points in time of the clock T more jitter-free. Time jitter may exist on the boundary between the clock domains 12 and 14/16. In general, this is described in PCT/EP2014/063763 which is hereby incorporated by reference, where the values, points in time of the clock T, of the FIFO addresses are averaged to derive a better estimate of the value of the clock T. Naturally, the resulting, averaged point in time of clock T is delayed compared to the actual point in time of the clock T, but this delay may be determined, resulting in a more jitter-free estimate of the point in time of the clock T to feed to the FIFOs 141/161.

The updating of the averaged point in time is controlled by the clocking signal of the pertaining candidate clock T1/T2 by reading the oldest entry of the FIFO/delay line and averaging the thus altered FIFO/delay line contents. Preferably, an updated point in time of the clock T is fed to the FIFO/delay line, when an entry is de-queued, so that the number of entries in the FIFO/delay line is constant.

A simple manner of averaging is to divide the sum by the number of entries, where the sum is maintained by subtracting the de-queued value and added the newly entered value.

A very simple division is obtained when the FIFO has $2^N$ entries, where N is an integer. Then, the generation of the mean value may simply be to add all the values of the FIFO and right shift the binary value N times or bits. The sum may be maintained by adding, to the "old" sum, the new, updated value transferred to the FIFO and subtracting the value being removed in the same instance.

In general, any processor/controller may be any type of controller, software controlled, hardwired or a combination thereof. The processor/controller may be, or form part of, an ASIC, a FPGA or the like. This processor/controller may also handle the storing in and removing of data from the FIFO. The processor/controller may be distributed and be formed of individual elements, such as an element handling the transfer and another element handling the deriving of the point in time.

The controller may derive the point in time in a number of manners. A simple manner is to derive a mean value or median value of the contents of the FIFO 142/162. Another manner is to derive a mean value or median value of only part of the contents of the FIFO, such as the newest and the oldest points in time (first and last data) in the FIFO.

More complex analyses may be performed in which weights are derived for individual points in time in the FIFO, where the weights are then taken into account in the deriving of the second point in time. The weights may be multiplied on to the points in time, for example. The weights may be derived from an analysis of the credibility of the respective point in time, such as from an analysis of an estimate of time jitter in or at the actual point in time.

It is clear that the determination of when the event signal fulfils a predetermined requirement may be performed in the controllers and/or the processor 121. This type of distribution of data analysis is known.

The determination may be made in the controllers which then merely need to transmit the corresponding point in time from the FIFOs 142/162 or derived therefrom to the FIFOs 141/161, as the processor 121 knows what these points in time mean. The point in time determined by the processor 121 thus may be obtained on the basis of the points in time received from the FIFOs 141/161. These points in time may be used for determining a number of types of information. If the points in time relate to when a periodic event signal has a maximum, for example, the points in time relating to one maximum (from all FIFOs 141/161) may be used for determining the point in time of a maximum. Additionally, the determined points in time of multiple maxima may be used for correcting the information to arrive at a very precise determination of the frequency and/or phase of the event signal.

The same type of analysis may be used when the controllers determine other parameters of the event signal (edges, slopes or the like)—also for non-periodic event signals.

The invention claimed is:

1. A system comprising:
    a master clock domain having a master clock and a master processor, the master clock being configured to output master points in time and
    a plurality of candidate clock domains each having:
        a candidate clock configured to output a candidate clock signal,
        an event signal input,
        a first and a second asynchronous register and
        a candidate controller configured to receive a first point in time from the first asynchronous register and a value from the event signal input and feed, timed by the candidate clock signal, at least a second point in time relating to the first point in time to the second asynchronous register,
    where:
        the master clock is configured to provide an actual master point in time to the first asynchronous registers and
        the master processor is configured to read the second points in time of the second asynchronous registers and derive first information therefrom.

2. The system according to claim 1, wherein the candidate controllers are configured to feed only the second point in time to the second asynchronous register.

3. The system according to claim 1, wherein the candidate controllers are configured to feed a pair of the second point in time and a second value, relating to the value, to the second register, the master controller being configured to derive the first information also on the basis of the received second values of the pairs.

4. The system according to claim 1, wherein the master processor is configured to derive, as the first information, an estimate of a point in time of the master clock, where the event signal:
    assumed a predetermined value,
    exceeded a predetermined value,
    fell below a predetermined value,
    altered between two values, and/or
    exceeded a threshold slope.

5. The system according to claim 3, wherein the master processor is configured to derive the first information from a pair having an earliest second point in time or a latest second point in time as well as a predetermined second value, a second value different from a predetermined value, a second value exceeding a predetermined value or a second value falling below a predetermined value.

6. The system according to claim 1, wherein the candidate controllers are configured to analyse the received value and feed the second point in time to the second register, when the received value fulfils a predetermined criterion.

7. The system according to claim 1, wherein at least one candidate controller is configured to convert the value into the second value.

8. The system according to claim 1, the system further comprising a timing device configured to receive points in time from the master clock and the first information and to output corrected points in time.

9. The system according to claim 1, further comprising, for at least one candidate clock domain, a processor configured to determine a delay between the master clock obtaining a predetermined value and the predetermined value being fed as the second point in time to the second asynchronous register.

10. The system according to claim 8 or 9, wherein the timing device is configured to output the corrected points in time also on the basis of the determined delay(s).

11. The system according to claim 8, further comprising a data receiving device configured to receive data from a data channel and points in time from the timing device and output received data and a point in time of receipt of the data.

12. The system according to claim 8, further comprising a data transmitting device configured to receive data, a point in time of transmission and corrected points in time from the timing device and to output the received data when the corrected point in time reaches the point in time of transmission.

13. The system according to claim 1, wherein the first asynchronous registers are implemented as delay lines.

14. A method of deriving first information, the method comprising the steps of:
  a master clock providing, in a master clock domain, points in time to first asynchronous registers,
  in each of a plurality of candidate clock domains:
    receiving the first point in time from a first asynchronous register and a value from an event signal input and feeding, timed by a candidate clock signal of the candidate clock domain, at least a second point in time, relating to the first point in time, to a second asynchronous register,
  in the master clock domain, reading the second points in time of the second asynchronous registers and deriving the first information therefrom.

15. The method according to claim 14, wherein the receiving/feeding step comprises feeding to the second register only the second point.

16. The method according to claim 14, wherein the receiving/feeding step comprises feeding to the second register a pair of the second point in time and a second value.

17. The method according to claim 14, wherein the step of deriving the first information comprises deriving, as the first information, an estimate of a point in time of the master clock, where the event signal:
  assumed a predetermined value,
  exceeded a predetermined value,
  fell below a predetermined value,
  altered between two values, and/or
  exceeded a threshold slope.

18. The method according to claim 16, wherein the step of deriving the first information comprises deriving the first information from a pair having an earliest second point in time or a latest second point in time as well as a predetermined second value, a second value different from a predetermined value, a second value exceeding a predetermined value or a value falling below a predetermined value.

19. The method according to claim 14, wherein the receiving/feeding step comprises feeding the second point in time to the second register, when the value fulfils a predetermined criterion.

20. The method according to claim 14, further comprising the step of, in at least one candidate clock domain, converting the value into the second value.

21. The method according to claim 14, the method further comprising the step of generating corrected points in time on the basis of points in time from the master clock and the first information.

22. The method according to claim 14, further comprising the step of, for at least one candidate clock domain, determining a delay between the master clock obtaining a predetermined value and the predetermined value being fed to the second asynchronous register as the second point in time.

23. The method according to claim 21 or 22, wherein the generation of the corrected points in time is based also on the determined delay(s).

24. The method according to claim 21, further the step of receiving data from a data connection and corrected points in time from the timing device and outputting a time of receipt of the received data.

25. The method according to claim 21, further comprising the steps of receiving:
  data,
  a point in time of transmission and
  corrected points in time
and outputting the received data when the corrected points in time reach the point in time of transmission.

26. A system according to claim 1, wherein the event signal inputs are configured to receive the same event signal.

27. A method according to claim 14, wherein the receiving step comprises receiving the event signal inputs receiving the same event signal.

* * * * *